(12) United States Patent
Ruan et al.

(10) Patent No.: US 7,024,515 B1
(45) Date of Patent: Apr. 4, 2006

(54) METHODS AND APPARATUS FOR PERFORMING CONTINUE ACTIONS USING AN ASSOCIATIVE MEMORY WHICH MIGHT BE PARTICULARLY USEFUL FOR IMPLEMENTING ACCESS CONTROL LIST AND QUALITY OF SERVICE FEATURES

(75) Inventors: Yixing Ruan, San Jose, CA (US); Chran Ham Chang, Fremont, CA (US); Pranav Dharwadkar, San Jose, CA (US); Hari Lalgudi, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 448 days.

(21) Appl. No.: 10/295,180

(22) Filed: Nov. 15, 2002

(51) Int. Cl.
*G06F 12/00* (2006.01)

(52) U.S. Cl. ............... 711/108; 711/5; 711/103; 711/170; 370/236; 370/389; 370/392

(58) Field of Classification Search ............ 711/5, 711/103–105, 108, 153–154, 170–173; 370/236, 370/389, 392; 709/223, 243, 238
See application file for complete search history.

(56) References Cited

U.S. PATENT DOCUMENTS

| | | |
|---|---|---|
| 5,088,032 A | 2/1992 | Bosack |
| 5,319,763 A | 6/1994 | Ho et al. |
| 5,481,540 A | 1/1996 | Huang |
| 5,515,370 A | 5/1996 | Rau |
| 5,740,171 A | 4/1998 | Mazzola et al. |
| 5,842,040 A | 11/1998 | Hughes et al. |
| 5,898,689 A | 4/1999 | Kumar et al. |
| 5,920,886 A | 7/1999 | Feldmeier |
| 5,930,359 A | 7/1999 | Kempke et al. |
| 6,000,008 A | 12/1999 | Simcoe |
| 6,061,368 A | 5/2000 | Hitzelberger |
| 6,091,725 A | 7/2000 | Cheriton et al. |
| 6,097,724 A | 8/2000 | Kartalopoulos |
| 6,141,738 A | 10/2000 | Munter et al. |
| 6,148,364 A | 11/2000 | Srinivasan et al. |
| 6,219,748 B1 | 4/2001 | Srinivasan et al. |

(Continued)

OTHER PUBLICATIONS

McAuley et al., Mar. 28-Apr. 1, 1993, IEEE, vol. 3, pp. 1382-1391.*

(Continued)

*Primary Examiner*—Donald Sparks
*Assistant Examiner*—Hashem Farrokh
(74) *Attorney, Agent, or Firm*—The Law Office of Kirk D. Williams

(57) ABSTRACT

Methods and apparatus are disclosed for use with an associative memory, such as for, but not limited to implementing access control list and quality of service features in a communications or computing device. Multiple lists, such as access control lists, may be manipulated to typically produce a single list of entries with continuation indications, or the lists might be provided from another source. An associative memory is programmed with entries with each entry typically including a corresponding continuation level indication or flag. One or more lookup words are then generated and provided to the associative memory for a particular packet (or other entity) corresponding to the different continuation levels. In one implementation, a modified version of the Order Dependent Merge technique is used to generate the list of entries and to identify the corresponding continuation level or other continuation indication and the corresponding action to be performed for each entry.

17 Claims, 8 Drawing Sheets

U.S. PATENT DOCUMENTS

| | | |
|---|---|---|
| 6,236,658 B1 | 5/2001 | Essbaum et al. |
| 6,237,061 B1 | 5/2001 | Srinivasan et al. |
| 6,240,485 B1 | 5/2001 | Srinivasan et al. |
| 6,243,667 B1 | 6/2001 | Kerr et al. |
| 6,285,378 B1 | 9/2001 | Duluk, Jr. |
| 6,289,414 B1 | 9/2001 | Feldmeier et al. |
| 6,295,576 B1 | 9/2001 | Ogura et al. |
| 6,308,218 B1* | 10/2001 | Vasa .................... 709/238 |
| 6,308,219 B1 | 10/2001 | Hughes |
| 6,374,326 B1 | 4/2002 | Kansal et al. |
| 6,377,577 B1 | 4/2002 | Bechtolsheim et al. |
| 6,389,506 B1 | 5/2002 | Ross et al. |
| 6,430,190 B1 | 8/2002 | Essbaum et al. |
| 6,434,662 B1 | 8/2002 | Greene et al. |
| 6,526,474 B1 | 2/2003 | Ross |
| 6,535,951 B1 | 3/2003 | Ross |
| 6,633,866 B1* | 10/2003 | Kishigami ................ 707/3 |
| 6,718,326 B1* | 4/2004 | Uga et al. .................. 707/6 |
| 2002/0191605 A1* | 12/2002 | Lunteren et al. .......... 370/389 |

OTHER PUBLICATIONS

Jon P. Wade and Charles G. Sodini, "A Ternary Content Addressable Search Engine," IEEE Journal of Solid-State Circuits, vol. 24, No. 4, Aug. 1989, pp. 1003-1013.

Teuvo Kohonen, Content-Addressable Memories, 1987, pp. 128-129 and 142-144, Springer-Verlang, New York.

Brian Dipert, ed., "Special-purpose SRAMs Smooth the Ride," EDN, Jun. 24, 1999, pp. 93-104.

"What is a CAM (Content-Addressable Memory)?," Application Brief AB-N6, Rev. 2a, Music Semiconductors, Milpitas, CA, Sep. 30, 1998, 4 pages.

"Reading Out the Valid LANCAM Memory Entries," Application Brief AB-N4, Rev. 1a, Music Semiconductors, Milpitas, CA, Sep. 30, 1998, 4 pages.

"Extending the LANCAM Comparand," Application Brief AB-N3, Rev. 1.0a Draft, Music Semiconductors, Milpitas, CA, Sep. 30, 1998, 4 pages.

"Advantages of CAM in ASIC-Based Network Address Processing," Application Brief AB-N11, Rev. 1.2a Draft, Music Semiconductors, Milpitas, CA, Sep. 30, 1998, 4 pages.

"Virtual Memory Applications of the MU9C1480A LANCAM," Application Note AN-N3, Rev. 1a, Music Semiconductors, Milpitas, CA, Sep. 30, 1998, 12 pages.

"Using the MU9C1965A LANCAM MP for Data Wider than 128 Bits," Application Note AN-N19, Rev. 1a, Music Semiconductors, Milpitas, CA, Sep. 30, 1998, 16 pages.

"Fast IPv4 and IPv4 CIDR Address Translation and Filtering Using the MUAC Routing CoProcessor (RCP)," Application Note AN-N25, Rev. 0a, Music Semiconductors, Milpitas, CA, Oct. 1, 1998, 16 pages.

"Using MUSIC Devices and RCPs for IP Flow Recognition," Application Note AN-N27, Rev. 0, Music Semiconductors, Milpitas, CA, Oct. 21, 1998, 20 pages.

"Wide Ternary Searches Using Music CAMs and RCPs," Application Note AN-N31, Rev. 0, Music Semiconductors, Milpitas, CA, Apr. 13, 1999, 8 pages.

Donald R. Morrison, "Patricia—Practical Algorithm to Retrieve Information Coded in Alphanumeric," Journal of the ACM, vol. 15, No. 4, Oct. 1968, pp. 514-534.

Waldvogel et al., "Scalable High Speed IP Routing Lookups," Proc. SIGCOMM '97, ACM, 1997, pp. 25-36.

Lampson et al., "IP Lookups Using Multiway and Multicolumn Search," Proc. Infocom 98, Mar. 1998, 24 pages.

V. Srinivasan and George Varghese, "Faster IP Lookups using Controlled Prefix Expansion," ACM SIGMETRICS Performance Evaluation Review, vol. 26 No. 1, Jun. 1998, p. 1-10.

Stefan Nilsson and Gunnar Karlsson, "Fast Address Lookup for Internet Routers," Proceedings of IEEE Broadband Communications, Apr. 1998, 12 pages.

William N. Eatherton, Hardware-Based Internet Protocol, Prefix Lookups, Master's thesis, Sever Institute, Washington University, St. Louis, MO, May 1999, 109 pages.

Lampson et al., "IP Lookups Using Multiway and Multicolumn Search," IEEE Transactions on Networking, vol. 7, No. 3, Jun. 1999, pp. 324-334.

Lookwood et al., "Field Programmable Port Extender (FPX) for Distributed Routing and Queuing," Proceedings of the ACM/SIGDA international symposium on Field programmable gate arrays, Feb. 2000, pp. 137-144.

Ruiz-Sanchez et al., "Survey and Taxonomy of IP Address Lookup Algorithms," IEEE Network Magazine, vol. 15, No. 2, Mar./Apr. 2001, pp. 8-23.

Pankaj Gupta and Nick McKewon, "Algorithms for Packet Classification," IEEE Network Magazine, vol. 15, No. 2, Mar./Apr. 2001, pp. 24-32.

Iyer et al., "ClassiPI: An Architecture for Fast and Flexible Packet Classification," IEEE Network Magazine, vol. 15, No. 2, Mar./Apr. 2001, pp. 33-41.

Waldvogel et al., "Scalable High Speed Prefix Matching," ACM Transactions on Computer Systems, vol. 19, No. 4, Nov. 2001, pp. 440-482.

Devavrat Shah and Pankaj Gupta, "Fast Incremental Updates on Ternary-CAMs for Routing Lookups and Packet Classification," Proc. Hot Interconnects VIII, Aug. 2000, Stanford. IEEE Micro, vol. 21. No. 1, Jan./Feb. 2001, 9 pages.

Waldvogel et al., "Scalable Best Matching Prefix Lookups," PODC98, ACM 1998.

Radia Perlman, Interconnections: Bridges, Routers, Switches, and Internetworking Protocols, Second Edition, Addison-Wesley, 2000, pp. 347-365.

Pankaj Gupta and Nick McKeown, "Algorithms for Packet Classification," IEEE Network Special Issue, Mar./Apr. 2001, vol. 15, No. 2, pp 24-32 (reprint 29 pages).

Srinivasan et al., "Packet Classification Using Tuple Space Search," ACM Computer Communication Review, 1999. ACM SIGCOMM'99, Sep. 1999 (12 pages).

Srinivasan et al., "Fast and Scalable Layer Four Switching," ACM Computer Communication Review, 28(4):191-202, 1998. ACM SIGCOMM'98, Sep. 1998 (12 pages).

Stefan Nilsson and Gunnar Karlsson, "IP-Address Lookup Using LC-Tries," IEEE Journal on Selected Areas in Communications, Jun. 1999 (12 pages).

* cited by examiner

METHODS AND APPARATUS FOR PERFORMING CONTINUE ACTIONS USING AN ASSOCIATIVE MEMORY WHICH MIGHT BE PARTICULARLY USEFUL FOR IMPLEMENTING ACCESS CONTROL LIST AND QUALITY OF SERVICE FEATURES

FIELD OF THE INVENTION

This invention especially relates to communications and computer systems; and more particularly, the invention relates to performing continue actions using an associative memory which might be particularly useful for, but is not limited to implementing access control list and quality of service features, such as in, but not limited to a computing or communications device (e.g., packet switching system, router, etc.)

BACKGROUND OF THE INVENTION

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Increasingly, public and private communications networks are being built and expanded using various packet technologies, such as Internet Protocol (IP).

A network device, such as a switch or router, typically receives, processes, and forwards or discards a packet based on one or more criteria, including the type of protocol used by the packet, addresses of the packet (e.g., source, destination, group), and type or quality of service requested. Additionally, one or more security operations are typically performed on each packet. But before these operations can be performed, a packet classification operation must typically be performed on the packet.

Packet classification as required for, inter alia, access control lists (ACLs) and forwarding decisions, is a demanding part of switch and router design. The packet classification of a received packet is increasingly becoming more difficult due to ever increasing packet rates and number of packet classifications. For example, ACLs typically require matching packets on a subset of fields of the packet header or flow label, with the semantics of a sequential search through the ACL rules.

Access control and quality of service features are typically implemented based on programming contained in one or more ACLs. To implement features in hardware, these multiple ACL lists are typically combined into one list, which can be used for programming and associative memory. Various techniques are known for combining these items, such as Binary Decision Diagram (BDD) and Order Dependent Merge (ODM). For example, if there are two ACLs A (having entries A1 and A2) and B (having entries B1 and B2), then ODM combines these original lists to produce one of two cross-product equivalent ordered lists, each with four entries: A1B1, A1B2, A2B1, and A2B2; or A1B1, A2B1, A1B2, and A2B2. These four entries can then be programmed into an associative memory and an indication of a corresponding action to be taken placed in an adjunct memory. Lookup operations can then be performed on the associative and adjunct memories to identify a corresponding action to use for a particular packet being processed. There are also variants of ODM and BDD which may filter out the entries which are unnecessary as their values will never allow them to be matched.

However, one problem with this approach is that only a single action is identified for a particular lookup based on the values found in the header of a packet, while actions specified in entries in both A and B might be needed to applied to a particular packet. One known mechanism to apply multiple actions is to use software to sequence through the ACLs, such as that performed by interpreters which might require textual parsing of the ACL for processed packet. This approach is comparatively very slow, and typically cannot keep up with increasing rates of packets.

Needed are new methods and apparatus for efficiently implementing access control list and quality of service features.

SUMMARY OF THE INVENTION

Methods and apparatus are disclosed for use with an associative memory, such as for, but not limited to implementing access control list and quality of service features in a communications or computing device. One embodiment identifies a merged element based on a first element and a second element. The first element has first element indications associated therewith, which typically include a first operation, a first action and a first continue indication. The second element has second element indications associated therewith, which typically include a second operation, a second action and a second continue indication. In response to determining that the first continue action corresponds to perform a continue action and the second action corresponds to permit, the programming of the associative memory is caused to include a first entry and a second entry, the first entry includes the merged element and a first entry continuation level, and the second entry includes the merged element and a second entry continuation level, where the second entry continuation level is next in a continuation series after the first entry continuation level. In one embodiment, an adjunct memory is programmed with the first action at a position corresponding to the first entry and the second action at a position corresponding to the second entry.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DETAILED DESCRIPTION

Figure 1:
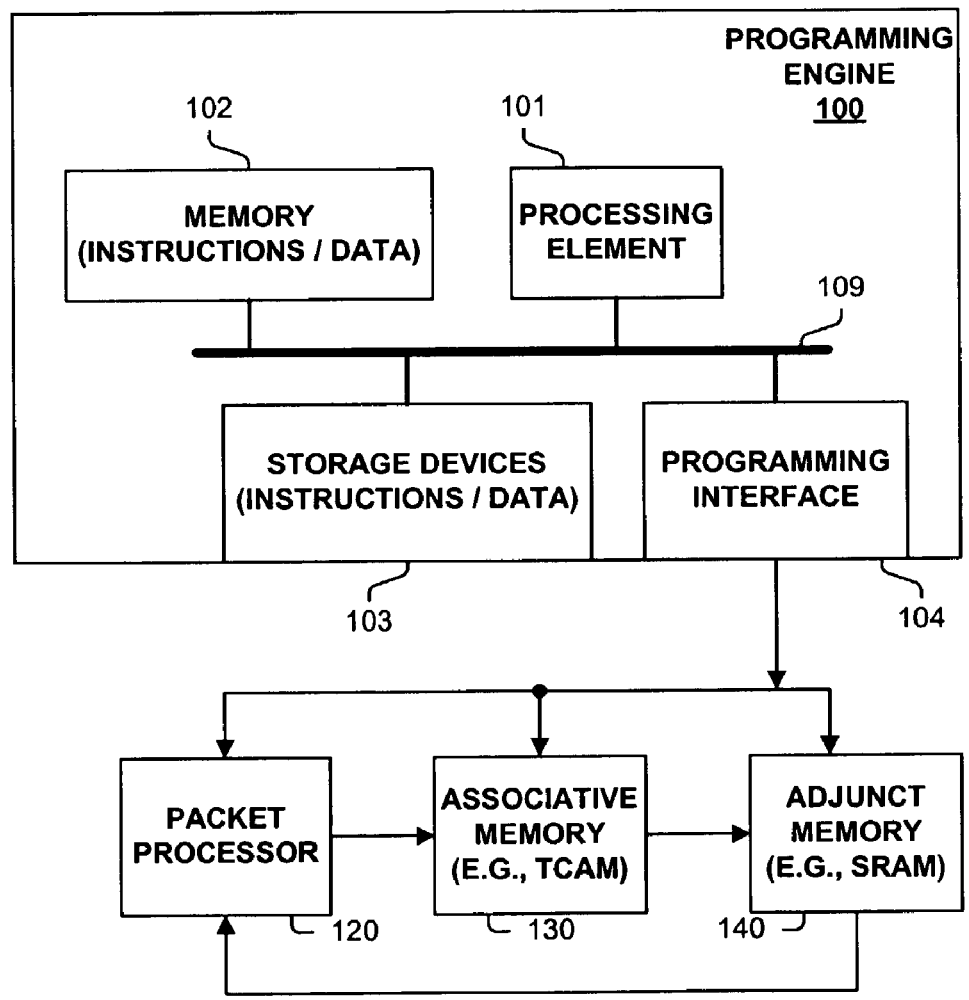
FIG. 1 is a block diagram of a programming engine used in one embodiment for generating and/or programming one or more associative and adjunct memories in accordance with the invention.

Methods and apparatus are disclosed for use with an associative memory, such as for, but not limited to implementing access control list and quality of service features in a communications or computing device. Embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable medium containing instructions. The embodiments described hereinafter embody various aspects and configurations within the scope and spirit of the invention, with the figures illustrating exemplary and non-limiting configurations.

As used herein, the term "packet" refers to packets of all types or any other units of information or data, including, but not limited to, fixed length cells and variable length packets, each of which may or may not be divisible into smaller packets or cells. The term "packet" as used herein also refers to both the packet itself or a packet indication, such as, but not limited to all or part of a packet or packet header, a data structure value, pointer or index, or any other part or identification of a packet. Moreover, these packets may contain one or more types of information, including, but not limited to, voice, data, video, and audio information. The term "item" is used herein to refer to a packet or any other unit or piece of information or data. The phrases "processing a packet" and "packet processing" typically refer to performing some steps or actions based on the packet contents (e.g., packet header or other fields), and such steps or action may or may not include modifying and/or forwarding the packet and/or associated data.

The term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processing elements and systems, control logic, ASICs, chips, workstations, mainframes, etc. The term "processing element" is used generically herein to describe any type of processing mechanism or device, such as a processor, ASIC, field programmable gate array, computer, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to any block and flow diagrams and message sequence charts, may be performed in the same or in a different serial or parallel ordering and/or by different components and/or processes, threads, etc., and/or over different connections and be combined with other functions in other embodiments in keeping within the scope and spirit of the invention. Furthermore, the term "identify" is used generically to describe any manner or mechanism for directly or indirectly ascertaining something, which may include, but is not limited to receiving, retrieving from memory, determining, calculating, generating, etc.

Moreover, the terms "network" and "communications mechanism" are used generically herein to describe one or more networks, communications mediums or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc. The term "message" is used generically herein to describe a piece of information which may or may not be, but is typically communicated via one or more communication mechanisms of any type.

The term "storage mechanism" includes any type of memory, storage device or other mechanism for maintaining instructions or data in any format. "Computer-readable medium" is an extensible term including any memory, storage device, and/or other storage mechanism. The term "memory" includes any random access memory (RAM), read only memory (ROM), flash memory, integrated circuits, and/or other memory components or elements. The term "storage device" includes any solid state storage media, disk drives, diskettes, networked services, tape drives, and other storage devices. Memories and storage devices may store computer-executable instructions to be executed by a processing element and/or control logic, and data which is manipulated by a processing element and/or control logic. The term "data structure" is an extensible term referring to any data element, variable, data structure, database, and/or one or more organizational schemes that can be applied to data to facilitate interpreting the data or performing operations on it, such as, but not limited to memory locations or devices, sets, queues, trees, heaps, lists, linked lists, arrays, tables, pointers, etc. A data structure is typically maintained in a storage mechanism. The terms "pointer" and "link" are used generically herein to identify some mechanism for referencing or identifying another element, component, or other entity, and these may include, but are not limited to a reference to a memory or other storage mechanism or location therein, an index in a data structure, a value, etc. The term "associative memory" refers to all types of known or future developed associative memories, including, but not limited to binary and ternary content-addressable memories, hash tables, TRIE and other data structures, etc.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the phrase "means for xxx" typically includes computer-readable medium containing computer-executable instructions for performing xxx.

In addition, the terms "first," "second," etc. are typically used herein to denote different units (e.g., a first element, a second element). The use of these terms herein does not necessarily connote an ordering such as one unit or event occurring or coming before the another, but rather provides a mechanism to distinguish between particular units. Additionally, the use of a singular tense of a noun is non-limiting, with its use typically including one or more of the particular item rather than just one (e.g., the use of the word "memory" typically refers to one or more memories without having to specify "memory or memories," or "one or more memories" or "at least one memory", etc.) Moreover, the phrases "based on x" and "in response to x" are used to indicate a minimum set of items x from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. The term "subset" is used to indicate a group of all or less than all of the elements of a set. Moreover, the term "or" is used herein to identify a selection of one or more, including all, of the conjunctive items.

Methods and apparatus are disclosed for use with an associative memory, such as for, but not limited to implementing access control list and quality of service features in a communications or computing device. Multiple lists, such as access control lists, may be manipulated to typically produce a single list of access control list entries (ACEs) with continuation indications, or the lists might be provided from another source. An associative memory is programmed with entries with each entry typically including a corresponding continuation level indication or flag. One or more lookup words are then generated and provided to the associative memory for a particular packet (or other entity) corresponding to the different continuation levels. In one embodiment, a modified version of the Order Dependent Merge technique is used to generate the list of entries and to identify the corresponding continuation level or other continuation indication and the corresponding action to be performed for each entry. While in one embodiment, a modified version of Binary Decision Diagram or another technique is used.

Methods and apparatus are disclosed for use with an associative memory, such as for, but not limited to implementing access control list and quality of service features in a communications or computing device. One embodiment identifies a merged element based on a first element and a second element. The first element has first element indications associated therewith, which typically include a first operation, a first action and a first continue indication. The second element has second element indications associated therewith, which typically include a second operation, a second action and a second continue indication. In response to determining that the first continue action corresponds to perform a continue action and the second action corresponds to permit, the programming of the associative memory is caused to include a first entry and a second entry, the first entry includes the merged element and a first entry continuation level, and the second entry includes the merged element and a second entry continuation level, where the second entry continuation level is next in a continuation series after the first entry continuation level. In one embodiment, an adjunct memory is programmed with the first action at a position corresponding to the first entry and the second action at a position corresponding to the second entry. Note, the reference to a merged element including first and second elements is non-limiting as some embodiments and the methods and apparatus disclosed herein may include more than two elements and/or more than two continue levels.

FIG. 1 is a block diagram of a programming engine 100 used in one embodiment for generating and/or programming one or more associative memories in accordance with the invention. In one embodiment, programming engine 100 receives or determines the entries to program one or more associative memories 130 and one or more adjunct memories 140. In one embodiment, programming engine 100 programs one or more associative memories 130 and one or more adjunct memories 140 using processes illustrated in FIGS. 3A–3B with entries illustrated in FIG. 3C. In one embodiment, programming engine 100 also programs packet processor 120 such that it generates lookup words with appropriate continue level indications, such as, but not limited to processes illustrated in FIGS. 5A and 5B.

In one embodiment, programming engine 100 includes a processing element 101, memory 102, storage devices 103, and programming interface 104, which are coupled via one or more communications mechanisms 109 (shown as a bus for illustrative purposes). Various embodiments of programming engine 100 may include more or less elements. The operation of programming engine 100 is typically controlled by processing element 101 using memory 102 and/or storage devices 103 to perform one or more tasks or processes. Memory 102 is one type of computer-readable medium, and typically comprises random access memory (RAM), read only memory (ROM), flash memory, integrated circuits, and/or other memory components. Memory 102 typically stores computer-executable instructions to be executed by processing element 101 and/or data which is manipulated processing element 101 for implementing functionality in accordance with the invention. Storage devices 103 are another type of computer-readable medium, and typically comprise solid state storage media, disk drives, diskettes, networked services, tape drives, and other storage devices. Storage devices 103 typically store computer-executable instructions to be executed by processing element 101 and/or data which is manipulated by processing element 101 for implementing functionality in accordance with the invention.

Figure 2:
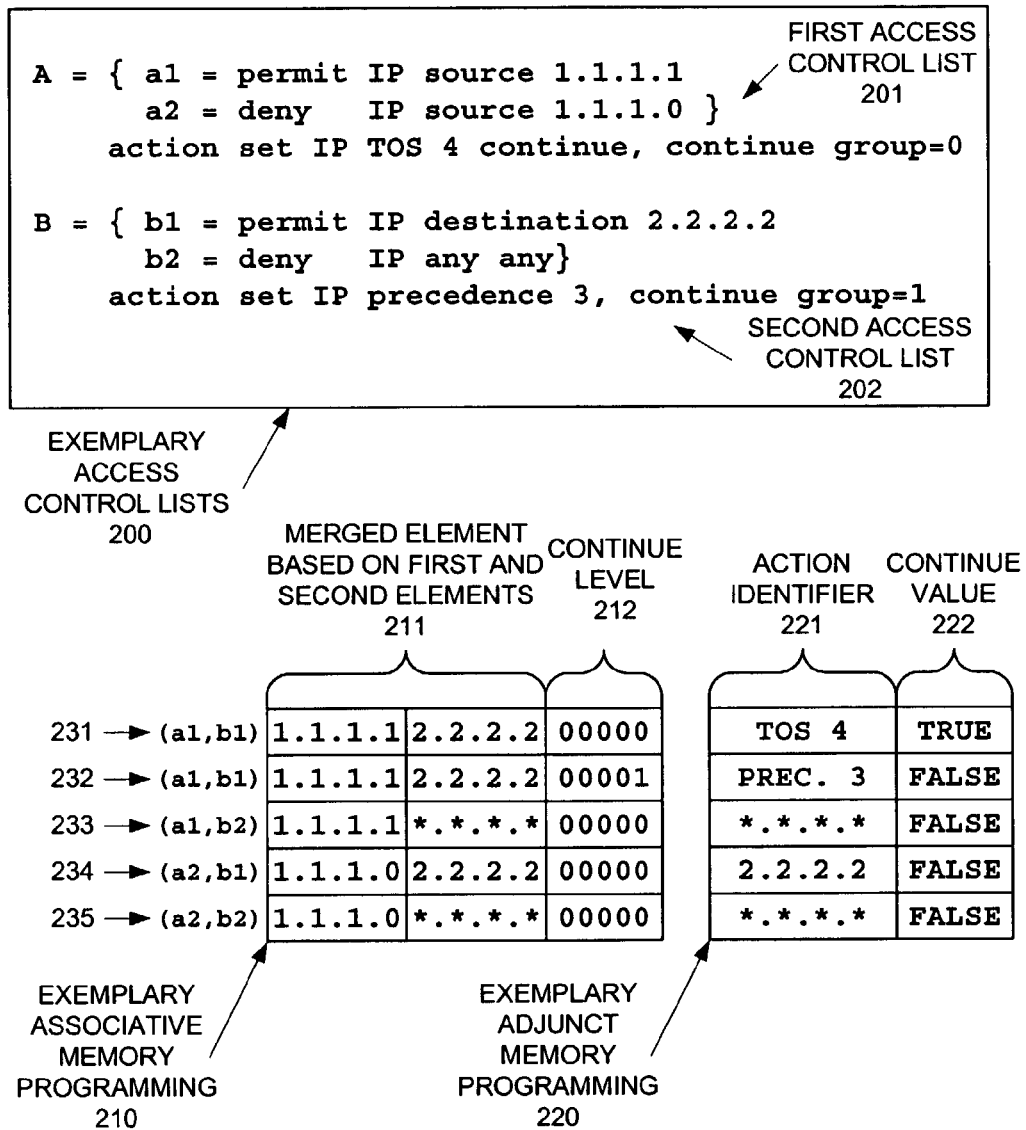
FIG. 2 is a block diagram illustrating an exemplary access control list and resultant associative and adjunct memory programming according to one embodiment.

FIG. 2 is a block diagram illustrating an exemplary access control list and resultant associative and adjunct memory programming according to one embodiment. An exemplary access control lists (ACLs) 200 is illustrated have a first ACL labeled A (201) and a second ACL labeled B (202). First and second ACLs 201 includes element indications, including, but not limited to an operation (e.g., permit for a1, deny for b2), actions (e.g., set IP TOS 4 for a1 and a2, set IP precedence 3 for b1 and b2), continue indication (e.g., continue for a1 and a2, no continue or null for b1 and b2). Additionally, as shown, element indications further include an optional continue group level (e.g., 0 for a1 and a2, and 1 for b1 and b2).

The corresponding associative memory programming 210 and adjunct memory programming 220 generated in one embodiment are also illustrated in FIG. 2. In one embodiment, each entry of the associative memory programming includes a merged element based on first and second elements 211 and a continue level indication 212. In one embodiment, each entry of the adjunct memory programming 220 includes an action identifier 221 and a continue value 222 (e.g., a flag or other value). Note, these programmed values are typically encoded for ease of implementation, while they are illustrated in FIG. 2 in a more easily human readable form. Also, the format of access control lists 200 may vary among implementations.

Based on first ACL 201 and second ACL 202, associative memory and access control list programmed entries 231–235 are generated. For example, entries 231 and 232 correspond to the cross-product element a1b1. Note, that merged element 211 of entry 231 corresponds to a1b1, which is shorthand notation for being derived based on elements a1 and b1, which in this case, corresponds to the source address of a1 in first ACL 201 and to the destination address of b1 of second ACL 202. However, the reference to a merged element based on a first and second element as used herein is expansive and extensible. For example, a merged element basically refers to the matching criteria derived from matching criteria of the first and second elements. Additionally, the ordering of matching criteria and even the placement of individual bits and bytes thereof derived from the first and second elements may vary among embodiments. Also, the merged element may have additional matching criteria derived from one or more other sources.

As shown in FIG. 2, there are two entries 231–232 because first ACL 201 and second ACL 202 both correspond to a permit action, and first ACL 201 includes a continue indication. Note, in one embodiment, although a second ACL might not specify a permit or deny operation, it is considered as corresponding to a permit operation for merging and/or programming purposes. FIG. 3B, discussed hereinafter, describes a process used in one embodiment for generating the entries for programming one or more associative memories and one or more adjunct memories.

Figure 3A:
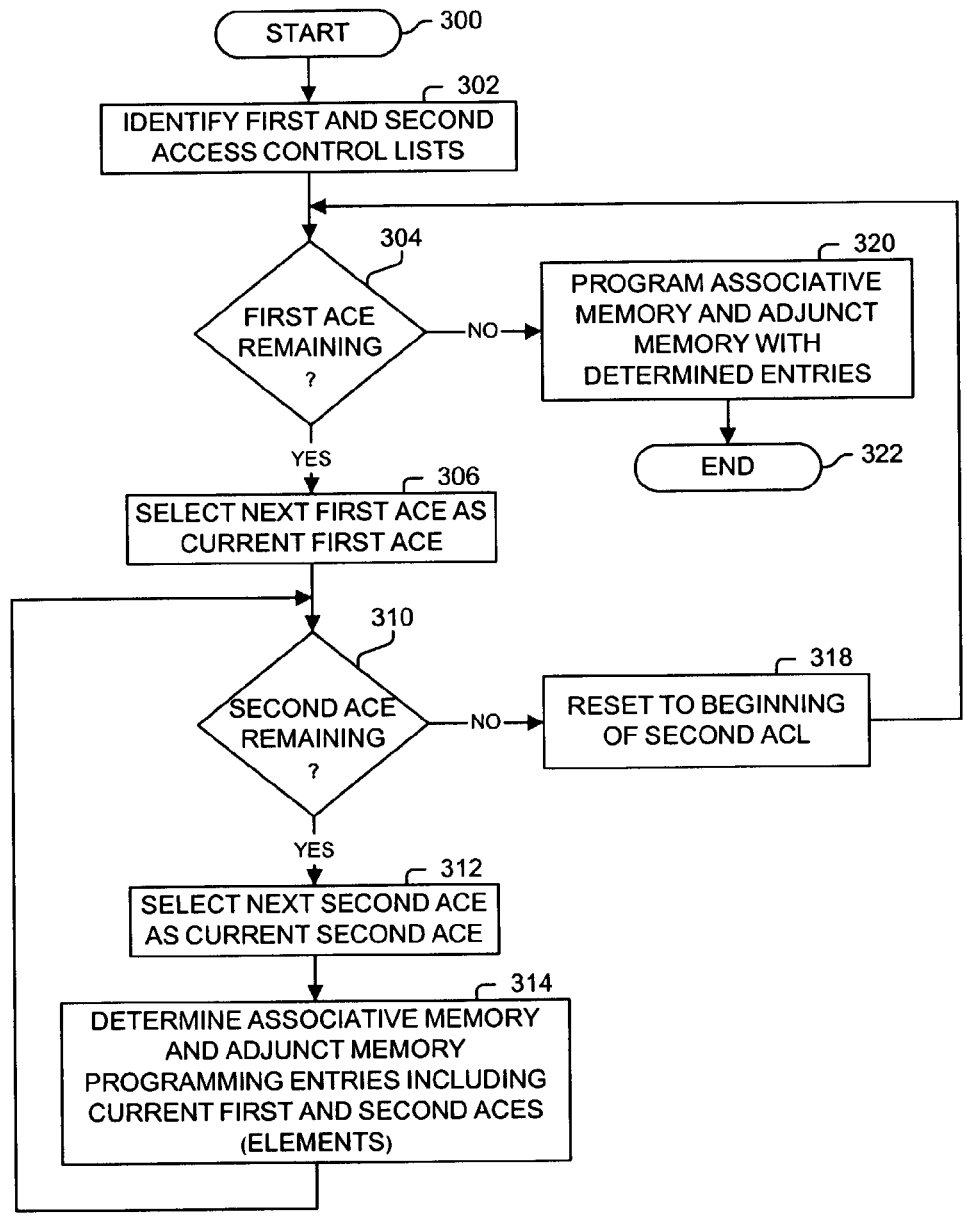
FIGS. 3A–B are flow diagrams illustrating processes used in one embodiment for generating entries and for programming the associative and adjunct memories.
Figure 3B:
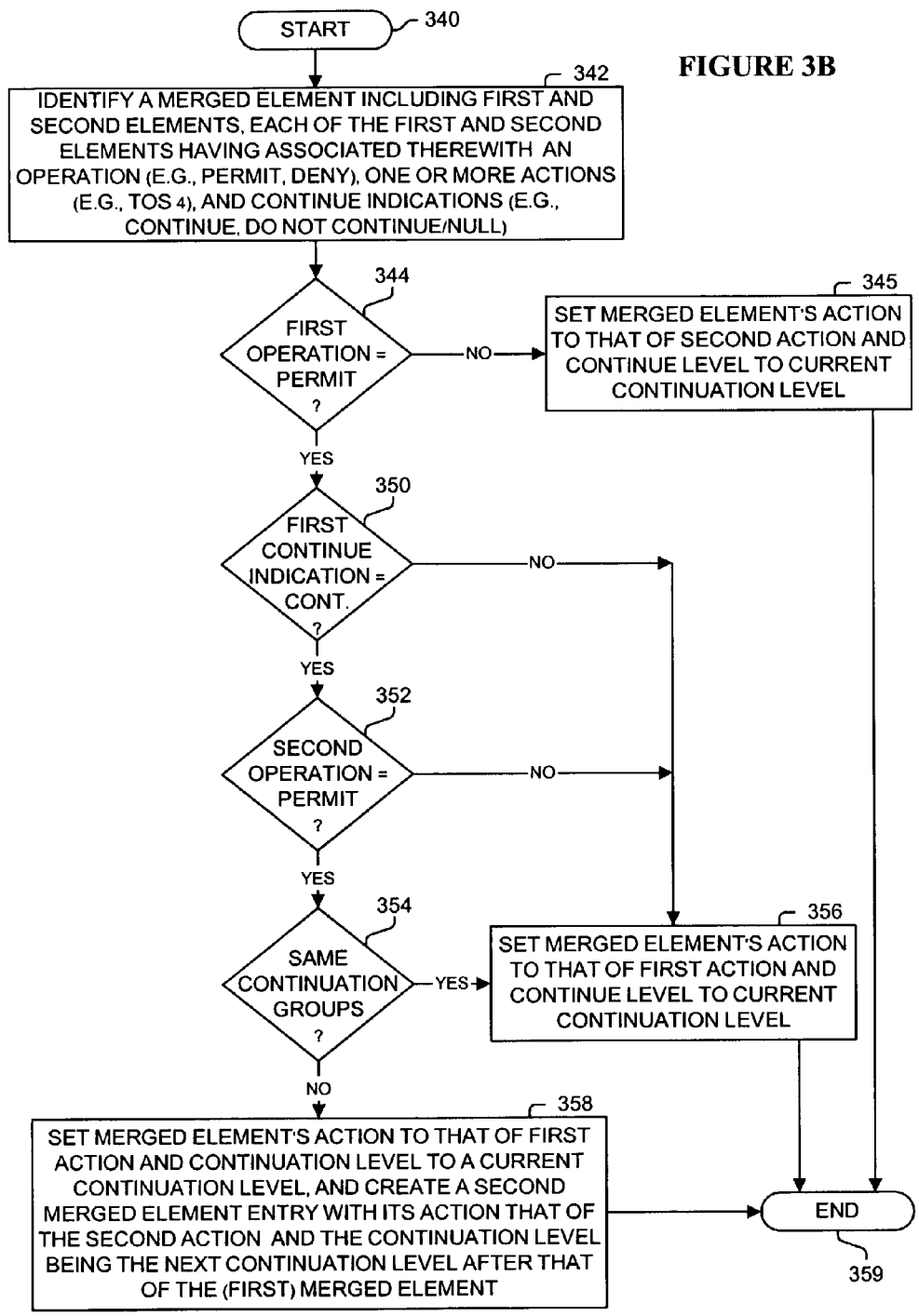

FIGS. 3A–B are flow diagrams illustrating processes used in one embodiment for generating entries and for programming the associative and adjunct memories. First, turning to FIG. 3A, processing begins with process block 300, and proceeds to process block 302, wherein the first and second access control (or other) lists (ACLs) are identified.

As determined in process block 304, while there are more access control list entries (ACEs) in the first access control list to process, process blocks 306–318 are repeatedly performed. In process block 306, the current first ACE is set to the next ACE in the first ACL. As determined in process block 310, while there are more ACEs in the second ACL to process, process blocks 312–314 are repeatedly performed. In process block 312, the current second ACE is set to the next second ACE in order specified in the second ACL. In process block 314, the associative memory and adjunct memory entries, which include the current first and second ACEs (or portions), are determined. In one embodiment, the associative memory and adjunct memory entries are determined according to the process illustrated in FIG. 3B. Processing then returns to process block 310. After the second ACL has been processed as determined in process block 310, then processing proceeds to process block 318 to reset to the beginning of the second ACL, and processing returns to process block 304. When all ACEs in the first ACL have been processed, then in process block 320, the associative memory and adjunct memories are programmed with the determined entries. Processing is completed as indicated by process block 322. Note, in one embodiment, the second ACL is processed in the outer while loop and the first ACL is processed in the inner while loop.

Turning to FIG. 3B, processing begins with process block 340, and proceeds to process block 342, wherein a merged element, based on first and second elements, is identified. The first element is typically derived from the current entry from the first ACL, while the second element is typically derived from the current entry from the second ACL. The first and second elements typically have associated therewith an operation (e.g., permit, deny), one or more actions (e.g., TOS 4), and continue indications (e.g., continue, do not continue/null/not specified). The programming entries for the element are then determined in one embodiment as follows.

As determined in process block 344, if the first operation is not permit, then in process block 345, the element's action is set to that identified in the second action and its continuation level is set to a current continuation level, and processing is complete as indicated by process block 359.

Otherwise, as determined in process block 350, if the first continue indication identifies to perform a continue operation, then if the second operation is permit (as determined in process block 352) and the first and second continue indications are in the same continuation group (as determined in process block 354), then processing proceeds to process block 358; otherwise processing proceeds to process block 356. Note, in one embodiment, although a second ACL might not specify a permit or deny operation, it is considered as corresponding to a permit operation for merging and/or programming purposes. Additionally, continuation groups allow, in one embodiment, a mechanism to prevent the generation of two (or more) associative memory entries for a merged element. Continuation groups (e.g., referenced in steps 354 and 356) are not used in one embodiment.

In process block 356, the element's action is set to that of the first action and the continue level of the entry is set to that of the current continuation level. While, in process block 358, two different sets of associative memory and adjunct entries are determined (e.g., identified) for the merged element and their corresponding actions and continue levels The first associative memory entry includes the merged element and a first entry continue level. The second associative memory entry includes the merged element and a second entry continue level, where the second entry continue level is next (or after) in a predetermined continue sequence or series after the first entry continue level. Also, the corresponding first adjunct memory entry is programmed with the first action and the second adjunct memory entry is programmed with the second action. Processing is complete as indicated by process block 359.

Figure 3C:
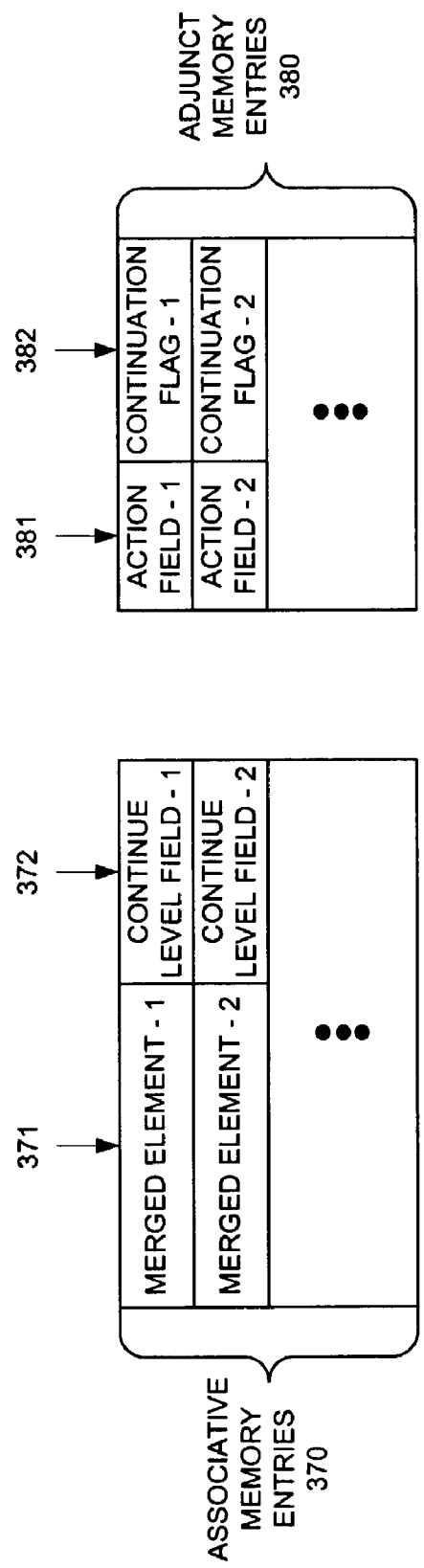
FIG. 3C is a block diagram of the format of associative and adjunct memory entries used in one embodiment.

FIG. 3C is a block diagram of the format of associative and adjunct memory entries used in one embodiment. As shown and in one embodiment, each of the associative memory entries 370 includes an element 371 (including a first element 372 and a second element 373) and a continue level field 374. As shown and in one embodiment, each of the adjunct memory entries 380 includes an action field 381 and a continuation flag 382.

Figure 4:
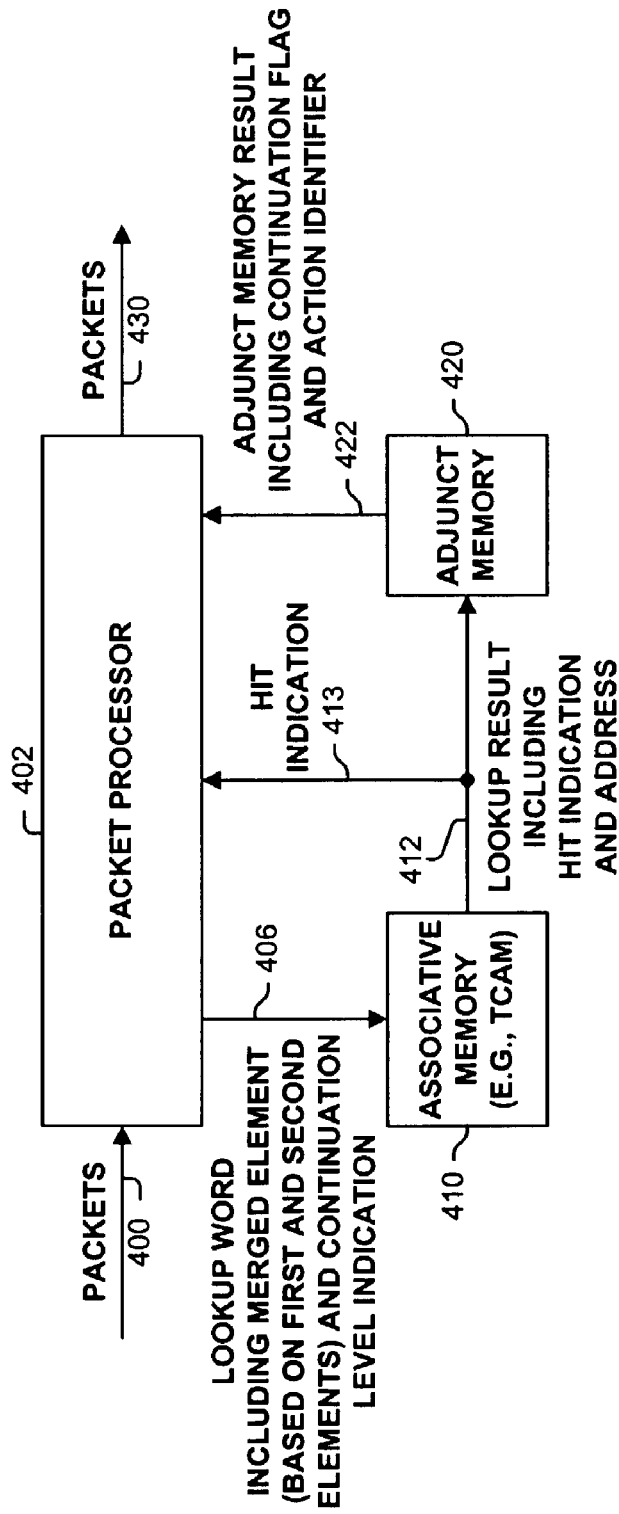
FIG. 4 is a block diagram of a mechanism for processing packets used in one embodiment.

FIG. 4 is a block diagram of a mechanism used in one embodiment for processing packets based on programmed associative and adjunct memories. One embodiment is programmed according to the processes illustrated in FIGS. 3A and 3B, and process packets according to the process illustrated in FIG. 5A or 5B, which will be described hereinafter. Turning to FIG. 4, packets 400 are received by packet processor 402. For each packet, one or more lookup words 406 are generated and provided to associative memory 410. In one embodiment, each lookup word 406 includes a the merged element (based on a first and a second element) and a continuation level indication.

Associative memory 410 performs a lookup operation one each received lookup word, and generates a lookup result 412, which typically includes a hit indication (e.g., whether or not there was a match) and if a match, the address of the matching entry. If there was such a match, then adjunct memory 420 performs a lookup based on the address received from associative memory 410, and generates adjunct memory result 422, which typically includes a continuation flag and action identifier. Based on hit indication 413 and/or adjunct memory result 422, packet processor 402 processes a corresponding one or more packets to produce packets 430 (or performs another operation such as dropping one or more packets).

Figure 5A:
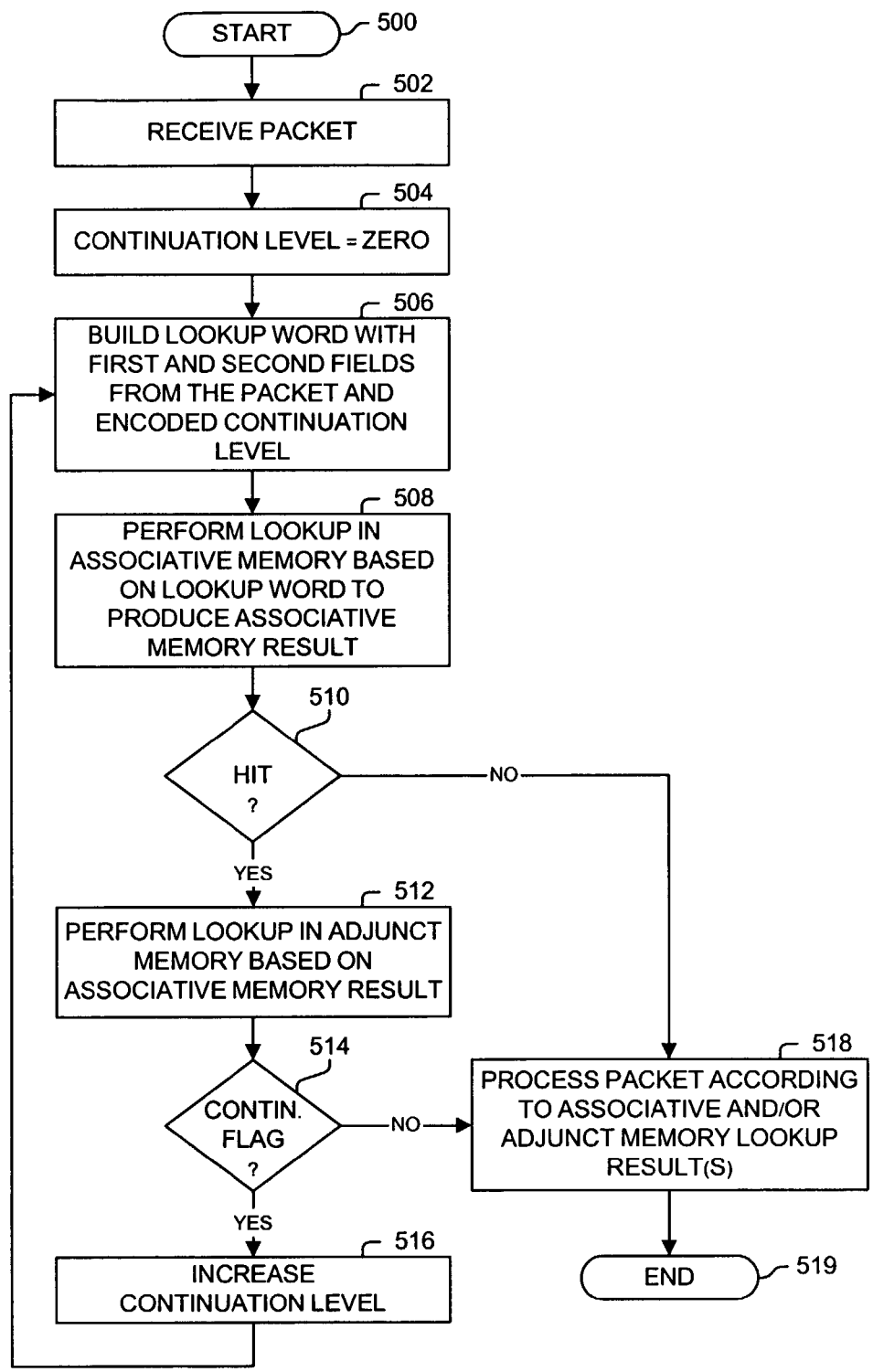
FIG. 5A is a flow diagram illustrating a process used in one embodiment for performing multiple continuation level lookup operations.

FIG. 5A illustrates a process used in one embodiment for performing multiple continuation level lookup operations. Processing begins with process block 500, and proceeds to process block 502, wherein a packet is received. Next, in process block 504, the current continuation level is set to zero. In process block 506, the lookup word is built typically based on first and second fields (e.g., source and destination addresses and/or other fields of the packet or even from other sources) of the received packet and the encoded current continuation level. Next, in process block 508, a lookup operation is performed in the programmed associative memory to produce the associative memory result. As determined in process block 510, if there was a hit, then in process block 512, a lookup operation is performed in the adjunct memory based on the associative memory result to produce the adjunct memory result (e.g., the lookup result). As determined in process block 514, if the continuation flag is set in the adjunct memory result, then in process block 516, the continuation level is increased to the next level, and processing returns to process block 506 to determine the next lookup word. Otherwise, the necessary lookup operations for the packet have been performed, and the packet is processed in process block 518, and processing is complete as indicated by process block 519.

Figure 5B:
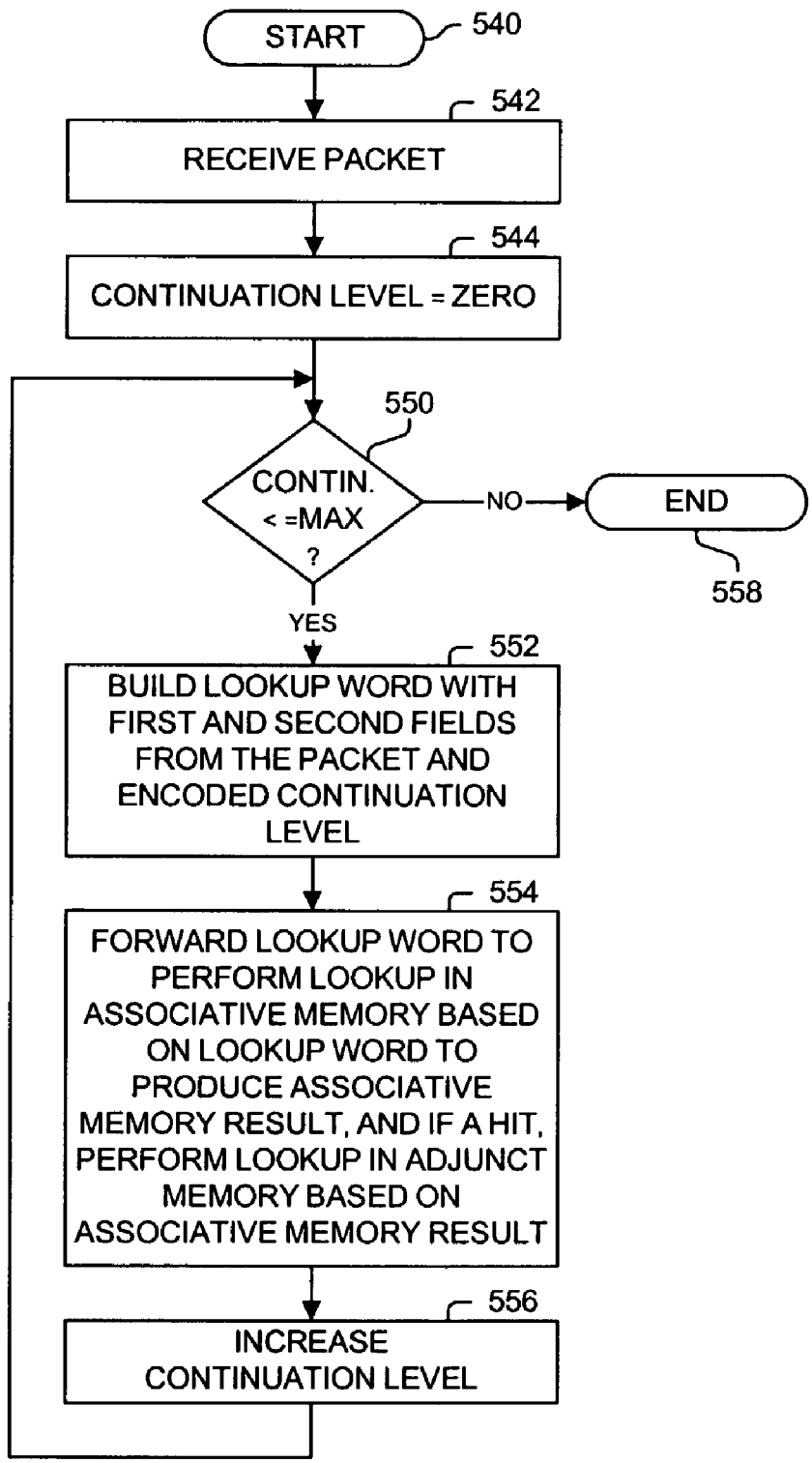
FIG. 5B is a flow diagram illustrating a process used in one embodiment for performing multiple continuation level lookup operations.

FIG. 5B illustrates a process used in one embodiment for performing multiple continuation level lookup operations. In this exemplary process, multiple the lookup words will be generated and multiple lookup operations will be performed for each packet, which may be efficient for a parallel, pipeline or other implementation. Another process will receive the results, filter the irrelevant ones, and process the packets accordingly.

Processing begins with process block 540, and proceeds to process block 542, wherein a packet is received. Next, in process block 544, the current continuation level is set to zero. As determined in process block 550, while the current continuation level is less than or equal to the maximum continuation level, process blocks 552–556 are repeatedly performed. In process block 552, a lookup word is built typically based on first and second fields (e.g., source and destination addresses and/or other fields of the packet or even from other sources) of the received packet and the encoded current continuation level. Next, in process block 554, a lookup operation is performed in the programmed associative memory to produce the associative memory result. In process block 556, the current continuation level is increased, and processing returns to process block 550. Processing is complete after all the lookup words have been generated as indicated by process block 558.

In view of the many possible embodiments to which the principles of our invention may be applied, it will be appreciated that the embodiments and aspects thereof described herein with respect to the drawings/figures are only illustrative and should not be taken as limiting the scope of the invention. For example and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A method for use with an associative memory, the method comprising:
   identifying a merged element based on a first element and a second element, the first element having first element indications associated therewith, said first element indications including a first operation, a first action, and a first continue indication, and the second element having second element indications associated therewith, said second element indications including a second operation and a second action;
   determining that the first continue indication corresponds to performing a continue action and the second operation corresponds to permit; and
   in response to said determining that the first continue indication corresponds to performing a continue action and the second operation corresponds to permit, causing programming of the associative memory to include a first entry and a second entry, the first entry including the merged element and a first entry continue level, the second entry including the merged element and a second entry continue level, the second entry continue level being the next in a continue series after the first entry continue level.

2. The method of claim 1, further comprising:
   programming an adjunct memory with the first action at a position corresponding to the first entry; and
   programming the adjunct memory with the second action at a position corresponding to the second entry.

3. The method of claim 2, further comprising:
   programming an adjunct memory with a first continue value at the position corresponding to the first entry; and
   programming the adjunct memory with a second continue value at the position corresponding to the second entry.

4. The method of claim 1, further comprising determining that the first action corresponds to permit; and
   wherein said determining that the first continue indication corresponds to performing a continue action and the second operation corresponds to permit is performed in response to said determining that the first action corresponds to permit.

5. The method of claim 1, further comprising:
   programming an adjunct memory with a first continue value at a position corresponding to the first entry; and
   programming the adjunct memory with a second continue value at a position corresponding to the second entry.

6. A computer-readable medium including computer-executable instructions for performing steps for use with an associative memory, said steps comprising:
   identifying a merged element based on a first element and a second element, the first element having first element indications associated therewith, said first element indications including a first operation, a first action, and a first continue indication, and the second element having second element indications associated therewith, said second element indications including a second operation and a second action;

determining that the first continue indication corresponds to performing a continue action and the second operation corresponds to permit; and in response to said determining that the first continue indication corresponds to performing a continue action and the second operation corresponds to permit, causing programming of the associative memory to include a first entry and a second entry, the first entry including the merged element and a first entry continue level, the second entry including the merged element and a second entry continue level, the second entry continue level being the next in a continue series after the first entry continue level.

7. The computer-readable medium of claim 6, including computer-executable instructions for performing steps including:

programming an adjunct memory with the first action at a position corresponding to the first entry; and programming the adjunct memory with the second action at a position corresponding to the second entry.

8. The computer-readable medium of claim 7, including computer-executable instructions for performing steps including:

programming an adjunct memory with a first continue value at the position corresponding to the first entry; and programming the adjunct memory with a second continue value at the position corresponding to the second entry.

9. The computer-readable medium of claim 6, including computer-executable instructions for performing steps including: determining that the first action corresponds to permit; and wherein said determining that the first continue indication corresponds to performing a continue action and the second operation corresponds to permit is performed in response to said determining that the first action corresponds to permit.

10. The computer-readable medium of claim 6, including computer-executable instructions for performing steps including:

programming an adjunct memory with a first continue value at a position corresponding to the first entry; and programming the adjunct memory with a second continue value at a position corresponding to the second entry.

11. An apparatus for use with an associative memory, the apparatus comprising:

means for identifying a merged element based on a first element and a second element, the first element having first element indications associated therewith, said first element indications including a first operation, a first action, and a first continue indication, and the second element having second element indications associated therewith, said second element indications including a second operation and a second action;

means for determining that the first continue indication corresponds to performing a continue action and the second operation corresponds to permit; and means for causing programming of the associative memory, in response to said determining that the first continue indication corresponds to performing a continue action and the second operation corresponds to permit, to include a first entry and a second entry, the first entry including the merged element and a first entry continue level, the second entry including the merged element and a second entry continue level, the second entry continue level being the next in a continue series after the first entry continue level.

12. The apparatus of claim 11, further comprising:

means for programming an adjunct memory with the first action at a position corresponding to the first entry; and means for programming the adjunct memory with the second action at a position corresponding to the second entry.

13. The apparatus of claim 12, further comprising:

means for programming an adjunct memory with a first continue value at the position corresponding to the first entry; and means for programming the adjunct memory with a second continue value at the position corresponding to the second entry.

14. The apparatus of claim 11, wherein the first entry includes a first action value corresponding to the first action and the second entry includes a second action value corresponding second action.

15. The apparatus of claim 11, further comprising:

means for programming an adjunct memory with a first continue value at a position corresponding to the first entry; and means for programming the adjunct memory with a second continue value at a position corresponding to the second entry.

16. A method for use with an associative memory, the method comprising:

identifying a merged element based on a first element and a second element, the first element having first element indications associated therewith, said first element indications including a first operation, a first action, and a first continue indication, and the second element having second element indications associated therewith, said second element indications including a second operation and a second action;

generating one or more associative memory entries and one or more adjunct memory entries, each of said one or more associative memory entries having a corresponding one of said one or more adjunct memory entries, said one or more associative memory entries including a first associative memory entry, said one or more adjunct memory entries including a first adjunct memory entry, the first adjunct memory entry corresponding to the first associative memory entry, the first associative memory entry including the merged element, and the first adjunct memory entry including a first action value;

wherein, when the first operation does not correspond to permit, then the first action value corresponds to the second action;

wherein when the first operation corresponds to permit and the first continue indication does not correspond to perform a continue operation, then the first action value corresponds to the first action;

wherein when the first operation corresponds to permit, the first continue indication corresponds to perform a continue operation, and the second operation does not correspond to permit, then the first action value corresponds to the first action; and wherein when the first operation corresponds to permit, the first continue indication corresponds to perform a continue operation, and the second operation corresponds to permit, then the first action value corresponds to the first action and the first entry includes a continue level having a first value, and said one or more associative memory entries includes a second associative memory entry, said one or more adjunct memory entries includes a second adjunct memory entry, the second adjunct memory entry corresponding to the second associative memory entry, the second associative memory entry including the merged element and a continuation level having a value after said first value in a predetermined continue level sequence, and the second adjunct memory entry including a second action value corresponding to the second action.

17. A computer-readable medium including computer-executable instructions for performing steps for use with an associative memory, said steps comprising:

identifying a merged element based on a first element and a second element, the first element having first element indications associated therewith, said first element indications including a first operation, a first action, and a first continue indication, and the second element having second element indications associated therewith, said second element indications including a second operation and a second action;

generating one or more associative memory entries and one or more adjunct memory entries, each of said one or more associative memory entries having a corresponding one of said one or more adjunct memory entries, said one or more associative memory entries including a first associative memory entry, said one or more adjunct memory entries including a first adjunct memory entry, the first adjunct memory entry corresponding to the first associative memory entry, the first associative memory entry including the merged element, and the first adjunct memory entry including a first action value;

wherein, when the first operation does not correspond to permit, then the first action value corresponds to the second action;

wherein when the first operation corresponds to permit and the first continue indication does not correspond to perform a continue operation, then the first action value corresponds to the first action;

wherein when the first operation corresponds to permit, the first continue indication corresponds to perform a continue operation, and the second operation does not correspond to permit, then the first action value corresponds to the first action; and wherein when the first operation corresponds to permit, the first continue indication corresponds to perform a continue operation, and the second operation corresponds to permit, then the first action value corresponds to the first action and the first entry includes a continue level having a first value, and said one or more associative memory entries includes a second associative memory entry, said one or more adjunct memory entries includes a second adjunct memory entry, the second adjunct memory entry corresponding to the second associative memory entry, the second associative memory entry including the merged element and a continuation level having a value after said first value in a predetermined continue level sequence, and the second adjunct memory entry including a second action value corresponding to the second action.

* * * * *